United States Patent Office 3,379,732
Patented Apr. 23, 1968

3,379,732
PHOSPHATE ESTERS OF 2,6-DIIODO-4-NITROPHENOL
Herman Eldridge Faith and Rodney D. Moss, Indianapolis, Ind., assignors to The Dow Chemical Company, Midland, Mich., a corporation of Delaware
No Drawing. Filed Feb. 7, 1966, Ser. No. 525,350
7 Claims. (Cl. 260—297)

The present invention is directed to a group of 2,6-diiodo-4-nitrophenyl phosphate compounds and particularly to 2,6-diiodo-4-nitrophenyl phosphate and to compounds corresponding to the formula

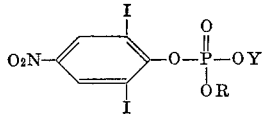

In such formulas in the present specification and claims, R represents alkyl containing from 1 to 2, to 3, to 4 carbon atoms, inclusive, and Y represents hydrogen, alkali metal, 1-alkylpyridinium and 2-(2-methoxyethyl)-pyridinium. In a preferred embodiment of the present invention R represents methyl. The compounds of the present invention are crystalline solid materials which are somewhat soluble in water and of variable solubility in common organic solvents. These materials have been found to be useful as anthelmintics for the control of helminth organisms which infect warm-blooded animals. Representative helminth organisms include *Ancyclostoma caninum* and *Haemonchus contortus*.

The 2,6-diiodo-4-nitrophenyl phosphate compound of the present invention corresponding to the formula

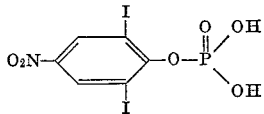

is prepared by hydrolyzing 2,6-diido-4-nitrophenyl phosphorodichloridate. The hydrolysis is readily carried out at temperatures between the freezing point and the boiling point of the reaction mixture and conveniently at a temperature of from 20° to 50° C. The desired product is then isolated by common procedures such as fractional distillation to remove the low boiling constituents and obtain the product as a solid residue. The solid product can be further purified by such common procedures as washing or recrystallization.

The 2,6-diiodo-4-nitrophenyl phosphorodichloridate compound employed as a starting material in the production of the 2,6-diiodo-4-nitrophenyl phosphate is prepared by reacting 2,6-diiodo-4-nitrophenol, sodium chloride or anhydrous magnesium chloride and phosphorus oxychloride. The reaction is carried out at a temperature between 25° C. and the boiling temperature of the reaction mixture with the resultant production of hydrogen chloride. The reaction mixture is maintained at the reaction temperature until there is a substantial cessation in the production of hydrogen chloride. The proportions of the reactants to be employed are not critical, some of the desired product being obtained when the reactants are combined in any proportions. However, in a preferred procedure the phosphorus oxychloride and the 2,6-diiodo-4-nitrophenol are employed in molecular ratios of 1:1 and conveniently in proportions not in excess of 10:1. The sodium chloride or magnesium chloride is employed in at least catalytic amounts.

In carrying out the preparation of the 2,6-diiodo-4-nitrophenyl phosphate, 2,6-diiodo-4-nitrophenol, sodium chloride or magnesium chloride, and phosphorus oxychloride are contacted together and heated at the boiling temperature and under reflux until there is a substantial cessation in the evolution of the hydrogen chloride gas. Following the heating period, the 2,6-diiodo-4-nitrophenyl phosphorodichloridate intermediate can be isolated from the reaction mixture by such conventional procedures as fractional distillation to remove the low boiling constituents and obtain the desired product as a solid residue or by diluting the reaction mixture with an organic solvent such as hexane in order to precipitate the phosphorodichloridate. The phosphorodichloridate intermediate is then mixed with water and heated at temperatures within the reaction temperature range for a short period of time. Thereafter the reaction mixture can be fractionally distilled to remove the low boiling constituents and obtain the phosphate product as a solid residue. This residue can be further purified by such conventional procedures as washing or recrystallization.

The alkali metal 2,6-diiodo-4-nitrophenyl alkyl phosphate compounds of the present invention corresponding to the formula

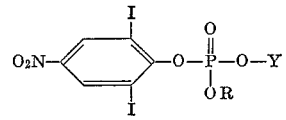

wherein Y is alkali metal are prepared by reacting an alkali metal iodide with a 2,6-diiodo-4-nitrophenyl dialkyl phosphate corresponding to the formula

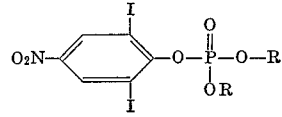

The reaction is carried out in the presence of an inert organic solvent as reaction medium. The reaction takes place readily at temperatures at which alkyl iodide and the desired product are produced. In a preferred procedure the reaction is carried out at a temperature of from 0° C. to the boiling temperature of the reaction mixture. The proportions of the reactants to be employed are not critical, some of the desired product being formed upon contacting the reactants in any proportions. However, the reaction consumes the reactants in equimolar proportions and the use of the reactants in such proportions is preferred.

In carrying out the production of the alkali metal 2,6-diiodo-4-nitrophenyl alkyl phosphates the alkali metal iodide such as sodium iodide or potassium iodide and the 2,6-diiodo-4-nitrophenyl dialkyl phosphate are contacted in any order or fashion in the presence of an inert organic solvent such as acetone or methyl ethyl ketone. The reaction mixture is maintained at a temperature in the reaction temperature range until there is a substantial cessation in the precipitation of the desired product. Thereafter the reaction mixture can be cooled to insure complete precipitation of the desired product. The precipitated solid alkali metal 2,6-diiodo-4-nitrophenyl alkyl phosphate product is separated from the reaction mixture by such conventional procedures as decantation, filtration or centrifiugation. Representative alkali metal 2,6-diiodo-4-nitrophenyl alkyl phosphate compounds thus prepared include potassium 2,6-diiodo-4-nitrophenyl n-propyl phosphate, sodium 2,6-diiodo-4-nitrophenyl isopropyl phosphate, potassium 2,6-diiodo-4-nitrophenyl ethyl phosphate, sodium 2,6-diiodo-4-nitrophenyl n-butyl phosphate.

The 2,6-diiodo-4-nitrophenyl alkyl phosphate compounds of the present invention are prepared by dissolving the alkali metal 2,6-diiodo-4-nitrophenyl alkyl phosphate in water and acidifying the solution to precipitate the 2,6- diiodo-4-nitrophenyl alkyl phosphate compound as a crystalline solid. The acidification can be carried out by the addition of the stoichiometric amount of a mineral acid, preferably hydrochloric acid. In a preferred procedure the acid is added slowly drop-wise until the desired product begins to precipitate. The precipitated product is then collected by such conventional procedures as filtration, decantation or centrifiugation.

The 2-(2-methoxyethyl)pyridinium 2,6 - diiodo-4-nitrophenyl alkyl phosphate compounds of the present invention, corresponding to the formula

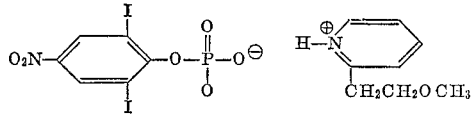

are prepared by reacting 2,6-diiodo-4-nitrophenyl alkyl phosphate with 2-(2-methoxyethyl)pyridine.

In a convenient procedure, the reactants can be contacted in the presence of an inert organic solvent such as ether or a hydrocarbon solvent. The reaction between the 2,6-diiodo-4-nitrophenyl alkyl phosphate and 2-(2-methoxyethyl)-pyridine takes place readily at temperatures between the freezing point and boiling point of the reaction mixture and preferably at about room temperature. The proportions of the reactants to be employed are not critical, some of the desired product being formed when the reactants are contacted in any proportions. However, the reaction consumes the reactants in equimolar proportions and the use of the reactants in such proportions is preferred.

In carrying out the production of the 2-(2-methoxyethyl)pyridinium 2,6-diiodo-4-nitrophenyl alkyl phosphate 2,6-diiodo-4-nitrophenyl alkyl phosphate is then contacted with 2-(2-methoxyethyl)pyridine. The reactants can be conveniently contacted in the presence of an inert organic solvent as reaction medium or the 2-(2-methoxyethyl)-pyridine can be employed as the reaction medium. Representative inert organic solvents include ether and hydrocarbon solvents such as toluene. The reaction mixture is maintained at a temperature in the reaction temperature range until there is a substantial cessation in the precipitation of the desired product. Following the reaction period the solid 2-(2-methoxyethyl)pyridinium 2,6-diiodo-4-nitrophenyl alkyl phosphate is separated from the reaction by conventional procedures. Representative 2-(2-methoxyethyl)pyridinium 2,6-diiodo-4-nitrophenyl alkyl phosphates include 2 - (2 - methoxyethyl)pyridinium 2,6-diiodo-4-nitrophenyl isopropyl phosphate, 2-(2-methoxyethyl)pyridinium 2,6-diiodo-4-nitrophenyl n-propyl phosphate and 2-(2-methoxyethyl)pyridinium n-butyl phosphate.

The 1-alkyl-pyridinium 2,6-diiodo-4-nitrophenyl alkyl phosphate compounds of the present invention corresponding to the formula

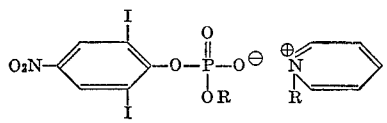

are prepared by reacting pyridine and 2,6-diiodo-4-nitrophenyl dialkyl phosphate. The reaction can be carried out in the theoretical amount of pyridine as reaction medium. The reaction proceeds readily at temperatures between 0° C. and the boiling temperature of the reaction mixture and preferably at temperatures of from 25° to 75° C. The reaction consumes the reactants in equimolar proportions and the use of the reactants in such proportions is preferred.

In carrying out the production of the 1-alkyl-pyridinium 2,6-diiodo-4-nitrophenyl alkyl phosphate, the reactants are contacted in any order or fashion. The reactants can conveniently be contacted in the presence of an inert organic solvent as reaction medium. Representative inert organic solvents include benzene, toluene, chlorobenzene, carbon tetrachloride and ether. Following the contacting of reactants, the temperature of the reaction mixture is maintained in the reaction temperature range until there is a substantial cessation in the precipitation of the desired product. The precipitated 1-alkyl-pyridinium 2,6-diiodo-4-nitrophenyl alkyl phosphate is isolated from the reaction mixture by such conventional procedures as decantation, filtration or centrifugation.

Representative 1-alkyl-pyridinium 2,6-diiodo - 4 - nitrophenyl alkyl phosphates includes 1-n-propylpyridinium 2,6-diiodo-4-nitrophenyl n-propyl phosphate, 1 - n - butyl pyridinium 2,6-diiodo - 4 - nitrophenyl n-butyl phosphate and 1-isopropylpyridinium 2,6-diiodo-4-nitrophenyl isopropyl phosphate.

The compounds of the present invention prepared and isolated as described in the foregoing paragraphs can be employed in anthelmintic compositions or further purified by such conventional procedures as recrystallization or washing before being so employed.

Example 1.—Sodium 2,6-diiodo-4-nitrophenyl methyl phosphate 2,6-diiodo-4-nitrophenyl dimethyl phosphate (12 grams; 0.0241 mole) and sodium iodide (3.6 grams; 0.0241 mole) were dispersed in 60 milliliters of dry acetone. The reaction mixture thus prepared was heated with stirring at the boiling temperature and under reflux for 2 hours. During the heating period the sodium 2,6-diiodo-4-nitrophenyl methyl phosphate compound precipitated in the reaction mixture and was subsequently removed therefrom by filtration. Nuclear magnetic resonance and infrared spectral analysis confirmed the product to be sodium 2,6-diiodo-4-nitrophenyl methyl phosphate.

Example 2.—2-(2-methoxyethyl)pyridinium 2,6-diiodo-4-nitrophenyl methylphosphate 2,6-diiodo-4-nitrophenyl methyl phosphate (6.9 grams; 0.014 mole) and 2-(2-methoxyethyl)pyridine (2.2 grams; 0.016 mole) were dissolved with stirring in toluene. Upon contacting the reactants the desired product precipitated in the reaction mixture. The precipitated product was separated from the reaction mixture by filtration and thereafter washed with toluene and anhydrous ether. The washed 2-(2-methoxyethyl)pyridinium 2,6-diiodo-4-nitrophenyl methyl phosphate product was recrystallized from toluene and found to melt at 118°–119.5° C.

Example 3.—1-methylpyridinium 2,6-diiodo-4-nitrophenyl methyl phosphate 2,6 - diiodo - 4 - nitrophenyl dimethyl phosphate (10 grams; 0.02 mole) and dry pyridine (1.66 grams; 0.021 mole) were dispersed in 95 milliliters of dry benzene. The reaction mixture was then heated with stirring at 45° C. for 18 hours whereupon the temperature was increased to and maintained at from 50° to 65° C. for 7 additional hours. During the warming period, the 1-methylpyridinium 2,6-diiodo-4-nitrophenyl methyl phosphate product precipitated in the reaction mixture. The precipitated product was removed by filtration and recrystallized from benzene. The recrystallized product was dissolved in dimethyl sulfoxide, filtered, and precipitated therefrom by the addition of ethyl acetate. The resulting product, when dried, was found to melt at 134°–137° C. Infrared and nuclear magnetic resonance studies confirmed the identity of the product.

Example 4.—2,6-diiodo-4-nitrophenyl methyl phosphate

Sodium 2,6-diiodo-4-nitrophenyl methyl phosphate (7.0 grams; 0.0138 mole) was dissolved in water and acidified with 5.5 grams of 10 percent hydrochloric acid. Upon the acidification of the aforesaid solution the 2,6-diiodo-4-nitrophenyl methyl phosphate product precipitates as a crystalline solid. The reaction mixture was then chilled to insure precipitation of substantially all of the product, filtered to collect the product, and the product thereafter washed with cold water. The washed 2,6-diiodo-4-nitrophenyl methyl phosphate product was found to melt at 202°–204° C.

Example 5.—2,6-diiodo-4-nitrophenyl phosphate 2,6-diiodo-4-nitrophenol (8.1 grams; 0.0207 mole) sodium chloride (0.1 gram) and phosphorus oxychloride (18 grams; 0.118 mole) were mixed and heated at the boiling temperature and under reflux until there was a substantial cessation in the evolution of hydrogen chloride (4.5 hours). Thereafter the reaction mixture was cooled to room temperature and diluted with dry hexane to precipitate the 2,6-diiodo-4-nitrophenyl phosphorodichloridate as a crystalline solid melting at 142–146° C. This phosphorodichloridate (9.4 grams) was mixed with 70 milliliters of water at 25° C. Following the contacting, the reaction mixture was stirred and the temperature thereof raised to 30° C. within 30 minutes. Thereafter stirring was continued and the temperature of the reaction mixture was maintained at 38° C. for an additional 40 minutes. The reaction mixture was then fractionally distilled under reduced pressure to obtain the phosphate product as a solid residue. This residue was thereafter dissolved in 100 millimeters of acetone, filtered and diluted with hexane. The addition of the hexane to the acetone solution caused the 2,6-diiodo-4-nitrophenyl phosphate product to precipitate as a solid. This solid product was separated by filtration, dried, and found to melt with decomposition at 211°–212° C. The product was found by elemental analysis to contain 53.9 percent iodine as compared to the theoretical content of 53.9 percent.

The following compounds of the present invention are prepared employing the procedures as described above.

Sodium 2,6 - diiodo - 4 - nitrophenyl ethyl phosphate (molecular weight 520.9) by reacting together 2,6-diiodo-4-nitrophenyl diethyl phosphate and sodium iodide.

2,6-diiodo-4-nitrophenyl ethyl phosphate (molecular weight 498.9) from sodium 2,6-diiodo-4-nitrophenyl ethyl phosphate.

2 - (2 - methoxyethyl)pyridinium 2,6 - diiodo - 4 - nitrophenyl ethyl phosphate (molecular weight 636.1) by reacting together 2,6-diiodo-4-nitrophenyl ethyl phosphate and 2-(2-methoxyethyl)pyridine.

(2 - (2 - methoxyethyl)pyridinium 2,6 - diiodo - 4 - nitrophenyl n-butyl phosphate (molecular weight 664.1) by reacting together 2,6-diiodo-4-nitrophenyl n-butyl phosphate and 2-(2-methoxyethyl)pyridine.

1 - ethylpyridinium 2,6 - diiodo - 4 - nitrophenyl ethyl phosphate (molecular weight 590.0) by reacting together 2,6 - diiodo - 4 - nitrophenyldiethylphosphate and pyridine.

Potassium 2,6-diiodo-4-nitrophenyl isopropyl phosphate (molecular weight 550.9) by reacting together 2,6-diiodo-4-nitrophenyl diisopropyl phosphate and potassium iodide.

Sodium 2,6-diiodo-4-nitrophenyl n-butyl phosphate (molecular weight 548.8) by reacting together 2,6-diiodo-4-nitrophenyl di-n-butyl phosphate and sodium iodide.

The 2,6-diiodo-4-nitrophenyl dialkyl phosphates employed as starting materials in the present invention are prepared from a 2,6-diiodo-4-nitrophenyl phosphorodichloridate intermediate. The latter is prepared by reacting together 2,6-diiodo-4-nitrophenol and phosphoryl chloride in the presence of magnesium as a catalyst. The reactants are heated at the boiling temperature and under reflux for a short period of time. Thereafter the reaction mixture is cooled and diluted with an organic solvent such as hexane, to precipitate the 2,6-diiodo-4-nitrophenyl phosphorodichloridate. The phosphorodichloridate thus obtained is reacted with an anhydrous alcohol such as methanol, ethanol, isopropanol, n-propanol or n-butanol in the presence of triethylamine as catalyst. The reaction is conveniently carried out in the presence of an organic solvent such as benzene. The reaction mixture is maintained at a temperature of from 25°–30° for a short period of time. Following the reaction period the reaction mixture is filtered to remove undesirable salts. Thereafter the filtrate is distilled in vacuo to obtain a solid residue which is triturated with cold diluted sodium hydroxide. The aqueous sodium hydroxide mixture is filtered to remove the insoluble 2,6-diiodo-4-nitrophenyl dialkyl phosphate as a crystalline solid. Representative dialkyl phosphates include 2,6-diiodo-4-nitrophenyl dimethyl phosphate, 2,6-diido-4-nitrophenyl diethyl phosphate, 2,6-diiodo-4-nitrophenyl di-n-proyl phosphate, 2,6-diiodo-4-nitrophenyl diisopropyl phosphate, and 2,6-diiodo-4-nitrophenyl di-n-butyl phosphate.

The compounds of the present application can be employed as the sole toxicant in anthelmintic compositions. The toxic compounds of the present invention can be administered orally or intragastrically. For such uses the toxicant compound can be administered in the form of capsules, tablets or boluses, or dispersed in animal feed compositions. Such compositions are generally given as a single dose or at frequent intervals over a short period. Daily doses of from 10 to 50 mg. of the phosphate compound of the present invention per kilogram of animal body weight as either single or divided doses, can be employed. Administration of the compounds at these levels for just one day is normally adequate therapeutic treatment, although additional treatments may be employed without adverse results.

In such compositions, the toxic compound can be employed singly or intimately dispersed or dissolved in inert diluents or carriers. The toxic compound can be blended or mixed with innocuous orally ingestable nutrients, diluents, fillers, binders, lubricants, suspending agents and like excipients by conventional formulating techniques.

Alternatively the compounds of the present invention may be administered parenterally after dissolving or suspending them in a suitable sterile carrier vehicle such as isotonic saline solution or a buffered aqueous solution. In such parenteral use the compounds are administered in doses of from 10 to 25 milligrams per kilogram of animal body weight.

In representative operations dogs known to be infected with hookworms (*Ancyclostoma caninum*) are administered a single hard gelatin capsule containing 25 milligrams of toxic compound per kilogram of body weight. In such operations 2,6-diiodo-4-nitrophenyl phosphate, 1-methylpyridinium 2,6-diiodo-4-nitrophenyl methyl phosphate, and 2-(2-methoxyethyl)pyridinium 2,6-diiodo-4-nitrophenyl methyl phosphate gave complete kills of the hookworms as shown by necropsy of the test animals 5 days after administration of the toxicant compound. In further operations, dogs known to be infected with hookworms were injected subcutaneously with 2,6-diiodo-4-nitrophenyl methyl phosphate in an amount equivalent to 10 milligrams per kilogram of body weight. In such uses the compound was dissolved in a buffered solution at pH 6.8. A necropsy of the dogs 5 days after the administration of the toxic compound showed no live hookworms.

I claim:

1. The compound selected from the group consisting of 2,6-diiodo-4-nitrophenyl phosphate and to the compounds corresponding to the formula

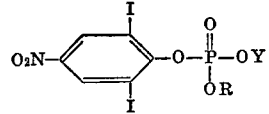

wherein R represents lower-alkyl and Y represents a member of the group consisting of hydrogen, alkali metal, 1-lower-alkyl-pyridinium and 2-(2-methoxyethyl)pyridinium.

2. The compound claimed in claim 1 wherein R represents methyl.

3. The compound claimed in claim 2 wherein Y represents sodium and corresponding to sodium 2,6-diiodo-4-nitrophenyl methyl phosphate.

4. The compound claimed in claim 2 wherein Y represents 2-(2-methoxyethyl)pyridine and corresponding to 2-(2-methoxyethyl)pyridinium 2,6-diiodo-4-nitrophenyl methyl phosphate.

5. The compound claimed in claim 2 wherein Y represents 1-methylpyridine and corresponding to 1-methylpyridinium 2,6-diiodo-4-nitrophenyl methyl phosphate.

6. The compound claimed in claim 2 wherein Y represents hydrogen and corresponding to 2,6-diiodo-4-nitrophenyl methyl phosphate.

7. The compound claimed in claim 1 corresponding to 2,6-diiodo-4-nitrophenyl phosphate.

References Cited

UNITED STATES PATENTS

| | | | |
|---|---|---|---|
| 2,758,954 | 8/1956 | Tidwell | 260—954 |
| 2,844,582 | 7/1958 | Raley | 260—297 |

JOHN D. RANDOLPH, *Primary Examiner.*

A. ROTMAN, *Assistant Examiner.*